(12) United States Patent
Moon et al.

(10) Patent No.: US 8,267,630 B2
(45) Date of Patent: Sep. 18, 2012

(54) THREADED FLANGED BUSHING FOR FASTENING APPLICATIONS

(75) Inventors: Francis R. Moon, Granby, CT (US);
John F. Corini, Barkhamsted, CT (US);
Gianfranco D. Conti, Ellington, CT (US)

(73) Assignee: United Technologies Corporation, Hartford, CT (US)

( * ) Notice: Subject to any disclaimer, the term of this patent is extended or adjusted under 35 U.S.C. 154(b) by 459 days.

(21) Appl. No.: 12/501,608

(22) Filed: Jul. 13, 2009

(65) Prior Publication Data
US 2011/0008125 A1    Jan. 13, 2011

(51) Int. Cl.
*F16B 23/00* (2006.01)
(52) U.S. Cl. .................. 411/338; 411/110; 411/321
(58) Field of Classification Search .................. 411/178, 411/303, 110, 111, 321, 323, 292
See application file for complete search history.

(56) References Cited

U.S. PATENT DOCUMENTS

| | | | |
|---|---|---|---|
| 2,750,979 A | 6/1956 | Jewett et al. | |
| 3,160,189 A * | 12/1964 | Hughes | 411/178 |
| 3,180,386 A * | 4/1965 | Bynum | 411/178 |
| 3,512,328 A * | 5/1970 | Eriksson | 52/787.1 |
| 3,646,981 A * | 3/1972 | Barnes | 411/82 |
| 4,005,740 A * | 2/1977 | Villo et al. | 411/167 |
| 4,282,913 A | 8/1981 | Trimmer | |
| 4,490,083 A * | 12/1984 | Rebish | 411/338 |
| 4,655,660 A * | 4/1987 | McGlone et al. | 411/366.2 |
| 4,735,536 A | 4/1988 | Duran | |
| 4,863,328 A | 9/1989 | Malek | |
| 4,895,485 A * | 1/1990 | Guevara et al. | 411/322 |
| 4,971,497 A | 11/1990 | Stoffer et al. | |
| 4,981,735 A * | 1/1991 | Rickson | 428/36.9 |
| 5,071,299 A * | 12/1991 | Sekine et al. | 411/183 |
| 5,191,689 A | 3/1993 | Slesinski et al. | |
| 5,207,445 A * | 5/1993 | Hoelzl | 280/607 |
| 5,244,326 A * | 9/1993 | Henriksen | 411/180 |
| 5,273,351 A * | 12/1993 | Rubel | 305/180 |
| 5,295,773 A * | 3/1994 | Amoroso | 411/80.2 |
| 5,297,851 A * | 3/1994 | Van Hekken | 297/452.14 |
| 5,411,357 A * | 5/1995 | Viscio et al. | 411/110 |
| 5,435,678 A * | 7/1995 | Stencel | 411/178 |
| 5,607,271 A | 3/1997 | Salice | |
| 5,704,749 A * | 1/1998 | Landgrebe | 411/366.2 |
| 5,779,413 A * | 7/1998 | Cosenza | 411/302 |
| 5,853,204 A | 12/1998 | Bartholomew | |
| 6,161,998 A | 12/2000 | Brown | |
| 6,283,491 B1 * | 9/2001 | Bush et al. | 280/611 |
| 6,454,613 B2 | 9/2002 | Valceschini | |
| 6,514,005 B2 * | 2/2003 | Shiokawa et al. | 403/408.1 |
| 6,540,462 B1 * | 4/2003 | Bretschneider et al. | 411/82 |

(Continued)

FOREIGN PATENT DOCUMENTS

EP    1843075 A1    10/2007

*Primary Examiner* — Gary Estremsky
(74) *Attorney, Agent, or Firm* — Kinney & Lange, P.A.

(57) ABSTRACT

A fastening system includes a first material having a first hole, a second material having a second hole, a bushing, and a threaded bolt. The bushing is located in the second hole and has a first end abutting the first material and a flanged second for securing the bushing to the second material. A threaded bolt extends through the first hole and into the bushing to secure the first material flush against the second material.

15 Claims, 5 Drawing Sheets

U.S. PATENT DOCUMENTS

| | | |
|---|---|---|
| 6,705,149 B2 | 3/2004 | Cobzaru et al. |
| 6,789,993 B2 * | 9/2004 | Ozawa et al. ................ 411/546 |
| 7,207,352 B2 | 4/2007 | Sadil |
| 7,234,906 B2 * | 6/2007 | Schultz ........................ 411/110 |
| 7,396,198 B2 | 7/2008 | Schultz |
| 2007/0046092 A1 | 3/2007 | Kreft |
| 2007/0134972 A1 * | 6/2007 | Hoy ............................... 439/353 |
| 2007/0158527 A1 | 7/2007 | Farah et al. |
| 2007/0207012 A1 | 9/2007 | Lorenzo |
| 2008/0003078 A1 | 1/2008 | Richards |
| 2008/0069660 A1 * | 3/2008 | Selle ............................ 411/179 |
| 2008/0138168 A1 | 6/2008 | Schruff |

* cited by examiner

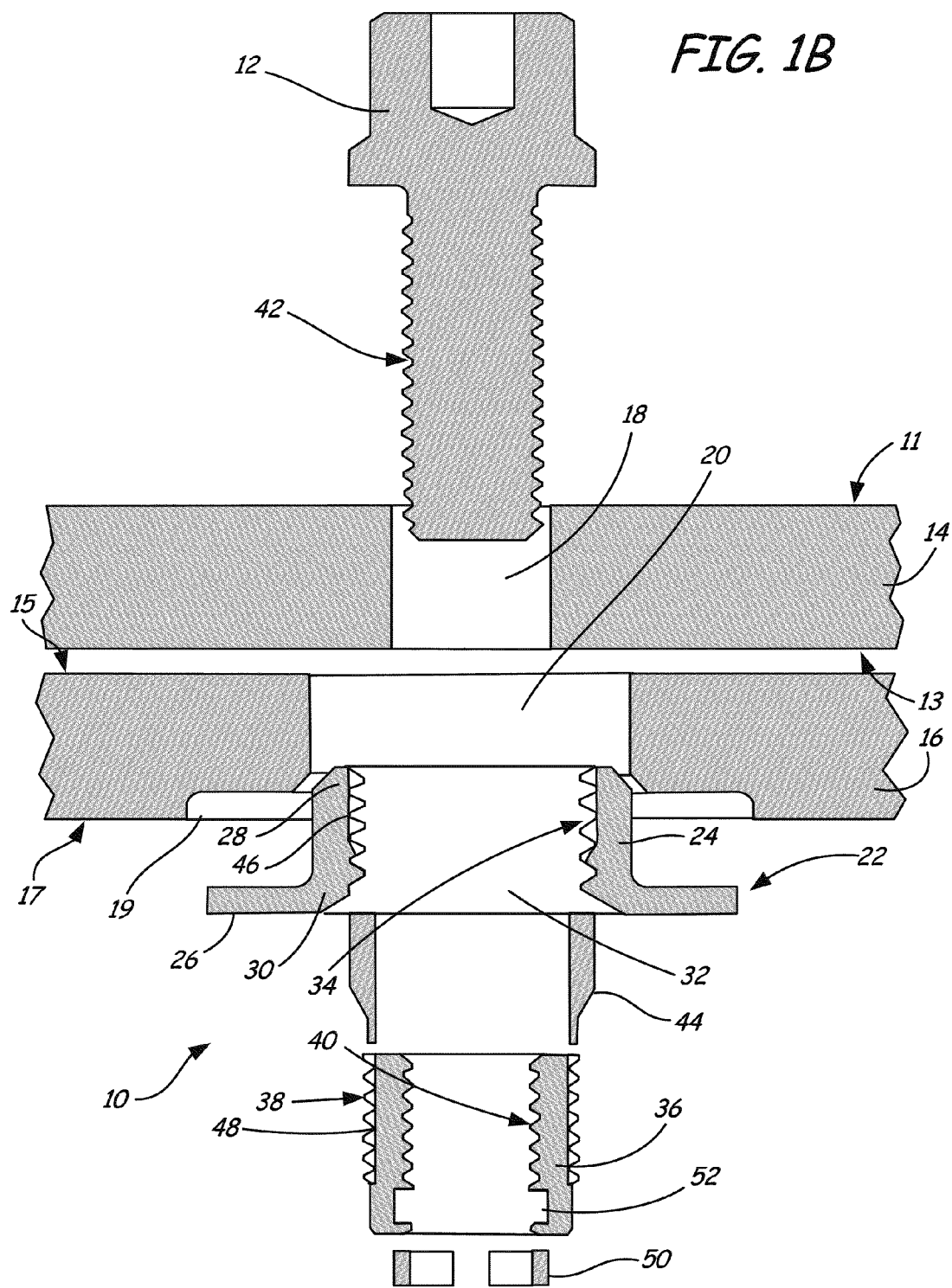

THREADED FLANGED BUSHING FOR FASTENING APPLICATIONS

STATEMENT OF GOVERNMENT INTEREST

The U.S. Government has a paid-up license in this invention and the right in limited circumstances to require the patent owner to license others on reasonable terms as provided for by the terms of N00019-02-C-3003 awarded by the U.S. Navy.

BACKGROUND

Two materials can be joined together by a variety of different techniques, such as welding, adhesives, or fastening. Often times, materials are fastened together by one or more "fasteners". In this context, a fastener is a piece of hardware that mechanically affixes two or more materials together. Known fasteners include nails, bolts, screws, and rivets. When joining materials with a fastener, it can be desirable to simultaneously distribute load. Known fastener and load distributor combinations include grommets and bushings.

Fastening composite materials creates a unique set of problems related to the thermal properties of the joined materials and the fastener system. Composite materials are desirable due to high strength-to-weight ratios and high temperature resistance, which allows them to be exposed to extreme environments. Composite materials, however, experience significant stresses when joined to metals with significantly different coefficients of thermal expansion. The disparity in thermal properties between composite materials and metals may mechanically strain fasteners as well as the surrounding composite material.

SUMMARY

An embodiment of the present disclosure is a fastening system including a bushing and a threaded bolt. The bushing is located within a first hole of a first material. The bushing has a first end substantially flush with a first surface of the first material, a second end having a flange for securing the bushing to the second surface of the first material, and an internally threaded bore extending along an inside surface of the bushing between the first end and second end. The threaded bolt extends through a second hole of a second material and into the bushing located within the first hole. The bushing and the threaded bolt secure the first material flush against the second material.

Another embodiment of the present disclosure is a method for fastening including aligning a first material having a first hole and a second material having a second hole so that the first hole and the second hole are coaxial and the first material and the second material are flush against one another. The method further includes inserting an internally threaded bushing into the first hole so that a first end of the bushing abuts the second material surrounding the second hole and a flanged second end extends out of the first hole to contact the first material surrounding the first hole. Additionally, the method includes securing the flanged second end of the bushing to the first material surrounding the first hole and inserting a bolt through the second hole into the bushing, thereby fastening the first material flush against the second material.

BRIEF DESCRIPTION OF THE DRAWINGS

FIG. 1B is an exploded cross-sectional view of FIG. 1A.

DETAILED DESCRIPTION

An internally threaded, flanged bushing for fastening applications, as well as systems and methods of use is provided. The bushing of the present disclosure can be advantageous where threads are required in a material which cannot, itself, be threaded. In addition, the bushing of the present disclosure can be advantageous where composite laminates or neat resin thermoplastics are subjected to thermal stresses.

Figure 1A:
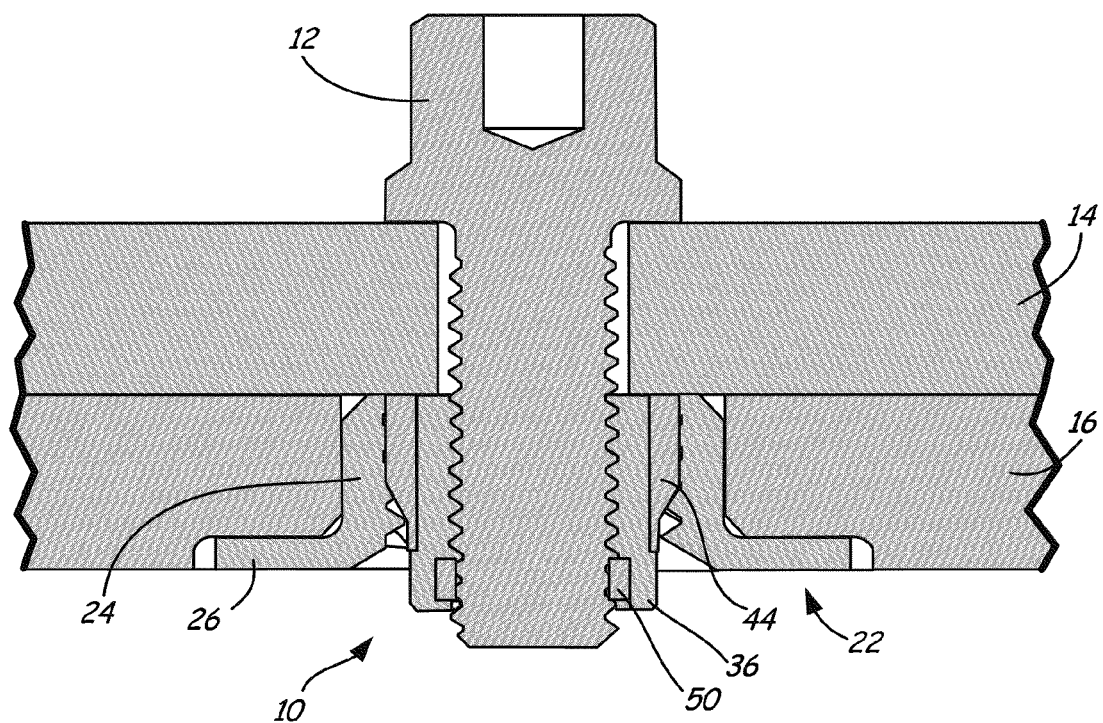
FIG. 1A is an assembled cross-sectional view of a bolt and a fastener joining a first material and a second material.

FIG. 1A is an assembled cross-sectional view of fastener 10 and bolt 12 fastening first material 14 flush against second material 16. FIG. 1B is an exploded cross-sectional view of the same and will be described in conjunction with FIG. 1A. First material 14 has first or top surface 11, second or bottom surface 13, and first hole 18. Second material 16 has first or top surface 15, second or bottom surface 17, counterbore 19, and second hole 20. Screw or bolt 12 extends through first hole 18 and into fastener 10 located in second hole 20 to secure first material 14 and second material 16 together.

First material 14 has top surface 11 and opposing, parallel bottom surface 13. First material 14 has first hole 18 extending perpendicularly from top surface 11, through first material 14, to bottom surface 13. Similarly, second material 16 has top surface 15 and opposing, parallel bottom surface 17. Second material 16 has second hole 20 extending perpendicularly from top surface 15, through second material 16, to bottom surface 17. Located on bottom surface 17, extending into second material 16 toward top surface 15, and generally surrounding second hole 20 is counter bore 19. Bottom surface 13 of first material 14 and top surface 15 of second material 16 are in physical contact so that the two surfaces 13, 15 lie flush against one another. First material 14 can be a composite laminate, neat resin thermoplastic, or metal. Likewise, second material 16 can be a composite laminate, neat resin thermoplastic, or metal. First material 14 and second material 16 are aligned so that first hole 18 is coaxial with second hole 20. In the embodiment depicted, first hole 18 and second hole 20 are simple circular holes, although the fastening system is not so limited. In order to accommodate fastener 10, a diameter of second hole 20 can be greater than a diameter of first hole 18.

Fastener 10 includes bushing 22, which has body 24, flange 26, and internally threaded bore 32. Body 24 can be further sub-divided into first end 28 and second end 30. Internally threaded bore 32 extends along an inside surface of body 24 between first end 28 and second end 30, and flange 26 is attached to second end 30. As a component of fastener 10, bushing 22 is located within second hole 20 such that first end 28 is abutting bottom surface 13 of first material 14 and flange 26 extends out of second hole 20 to rest within counter bore 19 second material 16. A light press fit between bushing 22 and second hole 20 will insure 360 degree contact, which can be desirable for load distribution. Although counter bore 19 is shown and described, in alternative embodiments counter bore 19 is absent so that flange 26 extends out of second hole 20 and attaches to bottom surface 17 of second material 16 to prevent pull-out. Without flange 26, a high-enough load directed from bolt 12 could cause fastener 10 to slide out of second hole 20. The perimeter of flange 26 is shaped like an oval, a race-track, or a truncated circle, so that additional bushings 22 can be inserted through first material 14 and second material 16 in close proximity to one another. In other words, bushing 22 has a smaller footprint than commercially available grommets and only minimally intrudes into second material 16, allowing more fasteners 10 to be inserted in a given area.

Bushing 22 is "low-profile" in that it lies just above, flush with, or below the surface of a parent material to which it attaches. For example, first end 28 is depicted as substantially flush with top surface 15 of second material 16 and adjacent or abutting bottom surface 13 of top material 14. This low-profile configuration allows first material 14 and second material 16 to be fastened flush against one another. Second material 16 can also include counterbore 19 so that flange 26 is substantially flush with bottom surface 17 of second material 16. When a fastener protrudes through the parent material, it can change the aerodynamics of the parent material and/or interfere with the interior structure of the parent material and/or complicate the mounting of additional exterior materials. A low-profile bushing, such as bushing 22 of the present disclosure, is advantageous because it does not significantly alter the surface of the parent material.

Bushing bore 32 includes bushing threads 34 for receiving bolt and/or insert 36. In the depicted embodiment, fastener 10 includes commercially available insert 36 where both external threads 38 and internal threads 40 are unified national coarse (UNC) threads, therefore having fewer threads per inch than unified national fine (UNF) threaded inserts. When insert 36 is disposed within bore 32, external threads 38 engage bushing threads 34 and internal threads 40 engage bolt threads 42. One or more stakes 44 can be positioned within bore 32 between insert 36 and bushing 22. Bore 32 has one or more internal slots 46 running vertically through bushing threads 34 for receiving stakes 44. Likewise, insert 36 has one or more external slots 48 running vertically through external threads 38 for receiving stakes 44. Stakes 44 prevent inadvertent rotation of insert 36 relative to bushing 22. Insert 36 can also include internal thread-locking ring 50 and annular groove 52 in internal threads 40 for receiving thread-locking ring 50. Thread-locking ring 50 comprises plastic, which is configured to crush when bolt threads 42 engage internal threads 40 of insert 36. When thread-locking ring 50 is crushed, the inner diameter of insert 36 is slightly reduced, thereby creating an engagement between insert 36 and bolt 12 that can withstand prolonged vibrations. Equivalents of thread-locking ring 50 include, but are not limited to, self-locking threads, self-locking features, adhesives, or self-locking inserts.

Figure 2A:
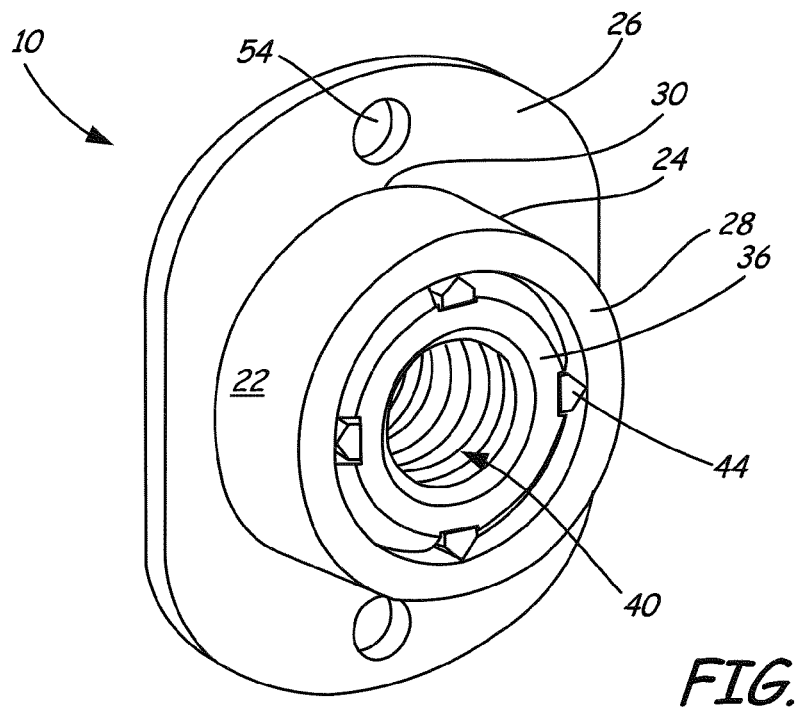
FIG. 2A is an assembled perspective view of an insert received by a bushing.
Figure 2B:
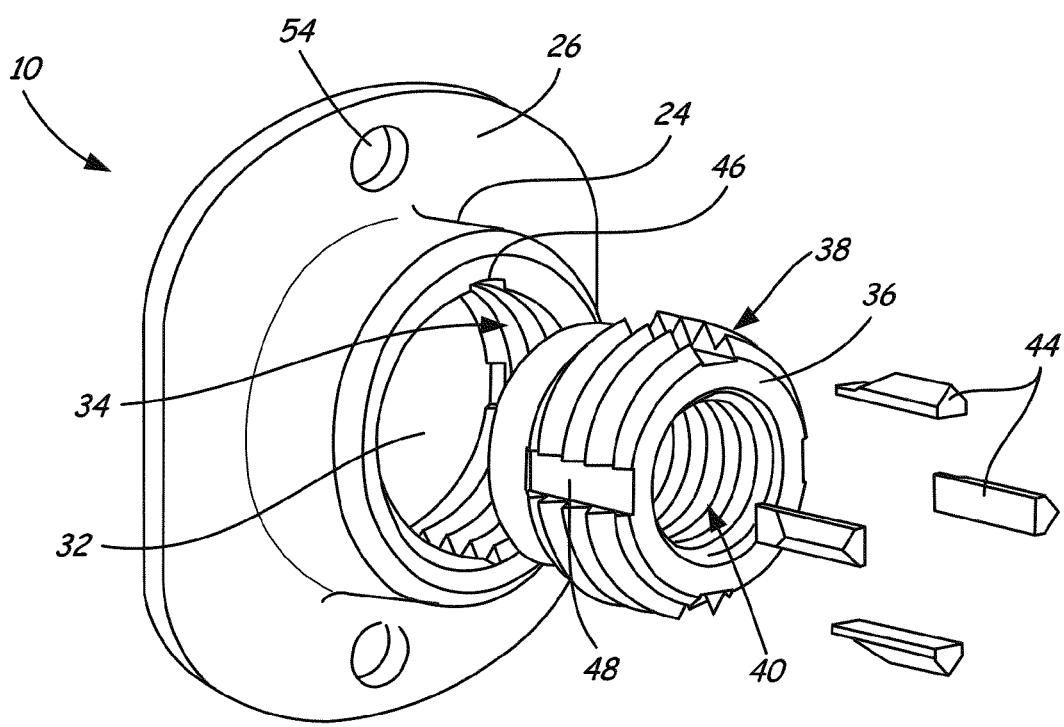
FIG. 2B is an exploded perspective view of FIG. 2A.
Figure 2C:
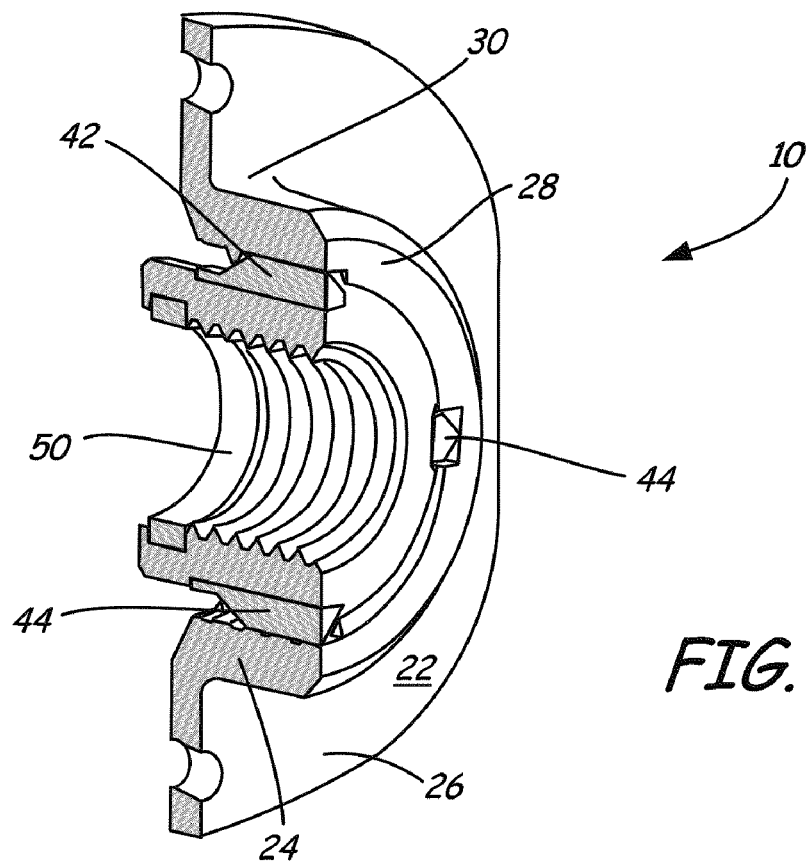
FIG. 2C is a cross-sectional view of FIG. 2A.

FIGS. 2A, 2B, and 2C depict fastener 10 without parent material. FIG. 2A is an assembled perspective view of fastener 10 showing insert 36 and stakes 44 received by bushing 22. FIG. 2B is an exploded view, and FIG. 2C is a cross-sectional view of the same and will be discussed in conjunction with FIG. 2A. The subcomponents of fastener 10 are configured to mate with one another and prevent rotation therebetween.

Bushing body 24 has internally threaded bore 32 for receiving a bolt and/or an insert. Internal bushing threads 34 receive external threads 38 of insert 36, or in alternative embodiments, for directly receiving a bolt (see FIG. 5). External threads 38 engage bushing threads 34 so that insert 36 is secured within bore 32 Bore 32 further includes internal slots 46 for receiving outside surfaces of stakes 44 and insert 36 has external slots 48 for receiving inside surfaces of stakes 44, such that stakes are sandwiched between insert 36 and bore 32. Stakes 44 prevent rotation of bushing 22 relative to insert 36. Internal threads 40 of insert 36 are configured to receive bolt 12. Thread-locking ring 50 is included near a bottom of internal threads 40 to further secure bolt 12 within insert 36. One or more holes 54 can be located on opposing sides of flange 26. Holes 54 are configured to receive rivets and thereby secure bushing 22 to a parent material (such as second material 16). The rivet-hole combination counters installation and assembly torques. In the embodiment depicted, flange 26 has two parallel secant cuts located 90° from holes 54, which create an oval or race-track shape. The oval shape is defined by two essentially parallel sides connected by two curved sides and is advantageous because it allows for more bushings 22 to be placed side-to-side into any given area.

Figure 3:
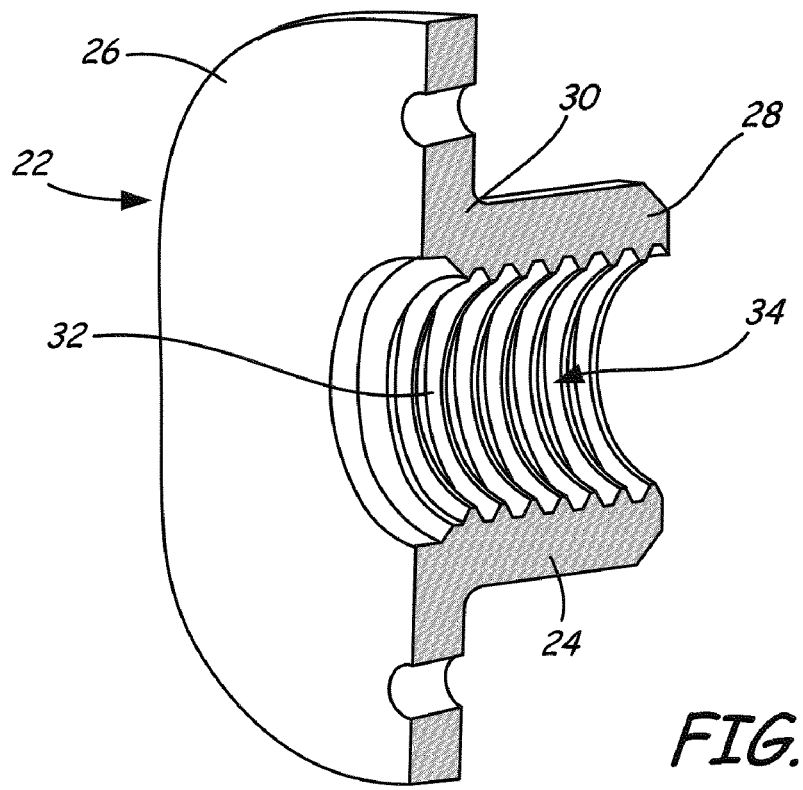
FIG. 3 is a cross-sectional view of a bushing.

FIG. 3 is a cross-sectional view of bushing 22 with insert 36 removed. Depicted in FIG. 3 are the components of bushing 22: body 24, flange 26, first end 28, second end 30, bore 32, and internal threads 34. The components of bushing 22 are arranged as described above. Bushing 22 can have an overall length between approximately 0.2 and 0.3 inches (0.51 and 0.76 centimeters). Bore 32 runs from first end 28 to second end 30 of body 24 and can have a length between approximately 0.15 and 0.25 inches (0.38 and 0.64 centimeters) and a width between approximately 0.3 and 0.45 inches (0.76 and 1.14 centimeters). Oval shaped flange 26 is the widest part of bushing 22 and can have a width between approximately 0.6 and 0.9 inches (1.52 and 2.30 centimeters). Flange 26 has two parallel secant cuts giving diameter of flange 26 a smaller dimension which allows closer center-to-center bushing spacing. A distance between a center of bushing 22 and hole 54 can be between approximately 0.6 and 0.9 inches (1.52 and 2.30 centimeters). Flange 26 can be machined separate from or integral with body 24. Bushing 22 can be comprised of metal, such as nickel-alloy, or thermoplastic.

Figure 4:
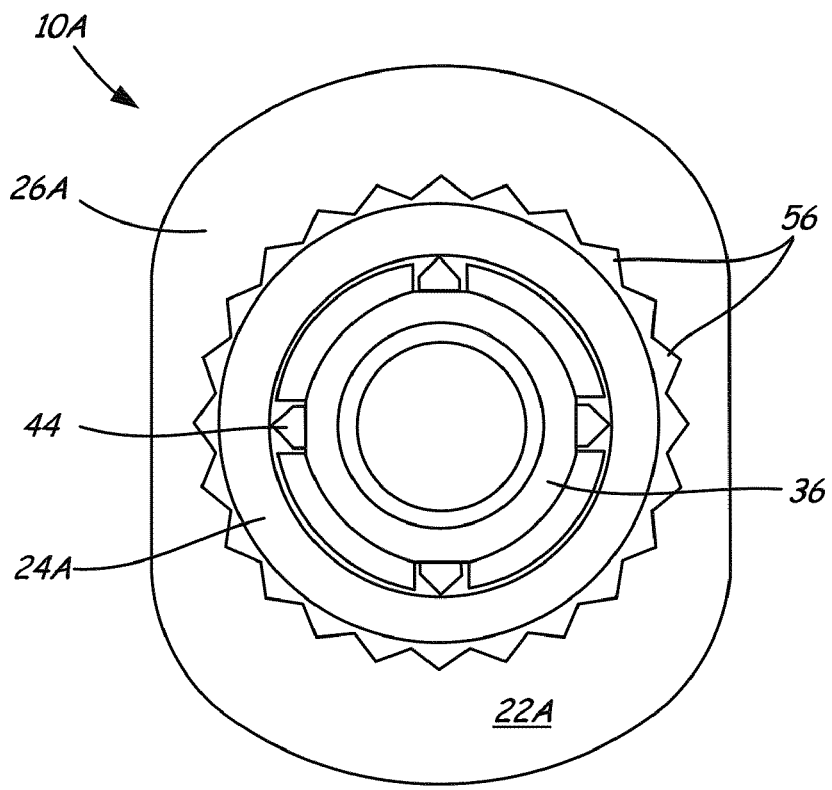
FIG. 4 is a top view of a fastener showing an alternative bushing.

FIG. 4 is a top view of alternative fastener 10A including castellated bushing 22A, insert 36, and stakes 44. Fastener 10A is similar to fastener 10 depicted in FIGS. 1-3 and may include any of the features described above. Like bushing 22 described above, bushing 22A has annular body 24A and oval-shaped flange 26 attached to an end of body 24A. In contrast to bushing 22 described above, bushing 22A has no holes in flange 26A. Instead of holes, body 22A incorporates castellations 56 adjacent flange 26A. When body 24A is inserted into a soft parent material, castellations 56 poke into and grab at the parent material to deter bushing 22A from moving. Castellations 56 are configured to deform a parent material into which bushing 22A is inserted. When securing bushing 22A to a parent material, it can be desirable to use force sufficient to deform the parent material. In other words, the force used to secure bushing 22A to the parent material may cause the parent material to change shape. This deformation of the parent material counters installation and assembly torques. Exemplary features provided for deformation of the parent material are castellations 56 and holes receiving rivets (such as holes 36 of FIGS. 2 and 3).

Figure 5:
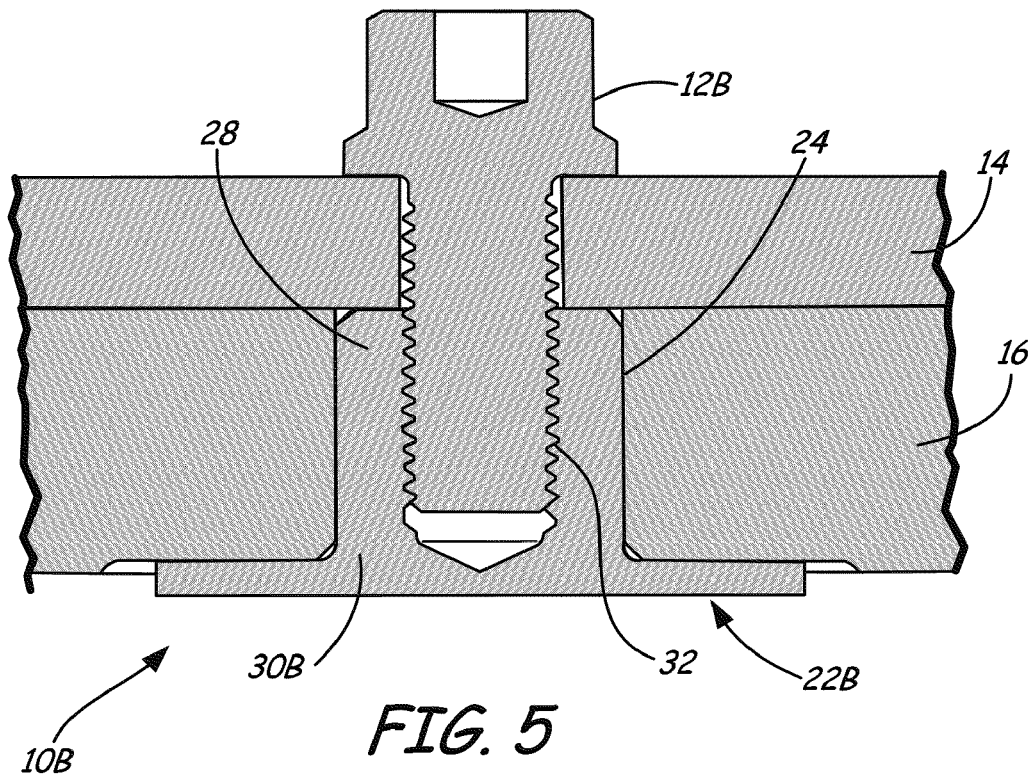
FIG. 5 is a cross-sectional view of a bolt and an alternative fastener joining a first material and a second material.

FIG. 5 is a cross-sectional view of alternative fastener 10B where blind bushing 22B directly receives bolt 12B thereby securing first material 14 to second material 16. Fastener 10B is similar to fasteners 10, 10A and may incorporate any of the features described above. Likewise, blind bushing 22B has similarities to bushings 22, 22A described above. For example, blind bushing 22B has body 24 extending between first end 28 and second end 30B, which defines internally threaded bore 32, and flange 22B located at second end 20B. In contrast to the through-bushings 22, 22A described above, bushing 22B is a blind bushing. Instead of being open-ended, second end 24B is closed because bushing 22B is intended to be used without an insert. Instead of receiving an insert, bore 32 directly receives bolt 12B. Internal threads of bore 32 directly engage external threads of bolt 12B. Because bushing 22B does not use an insert, it can be smaller and lighter than bushing 22 and bushing 22A.

While the invention has been described with reference to exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A fastener system comprising:
   a bushing located within a first hole of a first material, the bushing having a first end substantially flush with a first surface of the first material, a second end having a flange for securing the bushing to a second surface of the first material, and an internally threaded bore extending along an inside surface of the bushing between the first end and second end;
   a threaded bolt extending through a second hole of a second material and into the bushing located within the first hole, wherein the bushing and the threaded bolt secure the first material flush against the second material;
   an insert located within the first hole between the bolt and the bushing, the insert having internal threads for engaging the threaded bolt and external threads for engaging the internally threaded bore, the insert including at least one thread-locking ring; and
   at least one stake located between the insert and the bore to prevent rotation of the insert relative to the bushing.

2. The fastener system of claim 1, wherein the second end of the bushing is closed.

3. The fastener system of claim 1, wherein the first hole is larger than the second hole such that the first end of the bushing abuts a second surface of the second material located around the second hole.

4. The fastener system of claim 1, further comprising:
   a counterbore located in the second surface of the first material and extending around the first hole for receiving the flange.

5. The fastener system of claim 1, wherein the first material is a neat resin thermoplastic.

6. The fastener system of claim 1, wherein the first material is a composite laminate.

7. The fastener system of claim 1, wherein the bushing is formed of metal.

8. The fastener system of claim 1, wherein the bushing is formed of nickel-alloy.

9. The fastener system of claim 1, wherein the flange has an oval shape.

10. The fastener system of claim 1, wherein the threaded bolt extends out through the second end of the bushing.

11. The fastener system of claim 1, further comprising:
    a third hole and a fourth hole extending through opposite sides of the flange.

12. The fastener system of claim 11, wherein the flange includes two parallel secant cuts located 90° from the third hole and the fourth hole.

13. The fastener system of claim 1, further comprising:
    castellations adjacent the flange of bushing.

14. A fastener system comprising:
    a bushing located within a first hole of a thermoplastic material, the bushing having a first end substantially flush with a first surface of the thermoplastic material, a second end having an oval shaped flange for securing the bushing to a second surface of the thermoplastic material, and an internally threaded bore extending along an inside surface of the bushing between the first end and second end, wherein the second surface of the thermoplastic material includes a counterbore extending around the first hole for receiving the flange;
    a threaded bolt extending through a second hole of a second material and into the bushing located within the first hole, wherein the threaded bolt extends out through the second end of the bushing, wherein the bushing and the threaded bolt secure the thermoplastic material flush against the second material, wherein the first hole is larger than the second hole such that the first end of the bushing abuts a second surface of the second material located around the second hole;
    an insert located within the first hole between the bolt and the bushing, the insert having internal threads for engaging the threaded bolt and external threads for engaging the internally threaded bore, the insert including at least one thread-locking ring; and
    at least one stake located between the insert and the bore to prevent rotation of the insert relative to the bushing.

15. A fastener system comprising:
    a bushing located within a first hole of a composite laminate material, the bushing having a first end substantially flush with a first surface of the composite laminate material, a second end having an oval shaped flange for securing the bushing to a second surface of the composite laminate material, and an internally threaded bore extending along an inside surface of the bushing between the first end and second end, wherein the second surface of the composite laminate material includes a counterbore extending around the first hole for receiving the flange;
    a threaded bolt extending through a second hole of a second material and into the bushing located within the first hole, wherein the threaded bolt extends out through the second end of the bushing, wherein the bushing and the threaded bolt secure the composite laminate material flush against the second material, wherein the first hole is larger than the second hole such that the first end of the bushing abuts a second surface of the second material located around the second hole;
    an insert located within the first hole between the bolt and the bushing, the insert having internal threads for engaging the threaded bolt and external threads for engaging the internally threaded bore, the insert including at least one thread-locking ring; and
    at least one stake located between the insert and the bore to prevent rotation of the insert relative to the bushing.

* * * * *